United States Patent [19]
Yanagisawa

[11] Patent Number: 5,351,773
[45] Date of Patent: Oct. 4, 1994

[54] WALKING ROBOT

[76] Inventor: Ken Yanagisawa, c/o Kabushiki Kaisha Mechanic Sekkei Jimusho, 5175-1, Ooaza Toyoshina Toyoshina-machi, Minamiazumi-gun, Nagano-ken, Japan

[21] Appl. No.: 151,885

[22] Filed: Nov. 15, 1993

[30] Foreign Application Priority Data

Dec. 1, 1992 [JP] Japan .................... 4-349920

[51] Int. Cl.$^5$ ............................... B62D 51/06
[52] U.S. Cl. .................... 180/8.5; 180/8.3; 901/1
[58] Field of Search ............... 180/8.1, 8.2, 8.3, 8.5, 180/8.6; 901/1

[56] References Cited
U.S. PATENT DOCUMENTS

| | | | |
|---|---|---|---|
| 3,612,201 | 10/1971 | Smith | 180/8.6 |
| 3,734,220 | 5/1973 | Smith | 180/8.6 |
| 4,321,976 | 3/1982 | Reinke et al. | 180/8.5 |
| 4,333,259 | 6/1982 | Pin-Huang | 46/132 |
| 4,674,949 | 6/1987 | Kroczynski | 414/750 |
| 4,790,400 | 12/1988 | Sheeter | 180/8.6 |
| 4,940,382 | 7/1990 | Castelain et al. | 180/8.5 |

FOREIGN PATENT DOCUMENTS

| | | | |
|---|---|---|---|
| 2129197 | 12/1972 | Fed. Rep. of Germany | 180/8.5 |
| 206791 | 10/1985 | Japan | 180/8.5 |
| 60-226376 | 11/1985 | Japan . | |
| 64-36587 | 2/1989 | Japan | 180/901 |
| 3-294189 | 12/1991 | Japan . | |
| 472053 | 5/1975 | U.S.S.R. | 180/8.5 |
| 1266941 | 10/1986 | U.S.S.R. | 180/8.5 |

*Primary Examiner*—Margaret A. Focarino
*Assistant Examiner*—Kevin Hurley

[57] ABSTRACT

A walking robot capable of easily avoiding obstructions and easily being balanced while walking. The walking robot comprises: four corner blocks for connecting each end of X-guides and Y-guides; X-travellers being capable of moving in the X-direction; Y-travellers being capable of moving in the Y-direction; an X-rod being pierced through the Y-travellers; a Y-rod being pierced through the X-travellers, the Y-rod being connected to the X-rod; X-driving means for moving; Y-driving means for moving the Y-travellers; Z-driving means for moving the corner blocks, the X-travellers and the Y-travellers in a Z-direction perpendicular to the X- and Y-directions, the Z-driving means being provided to the corner blocks, both ends of the X-rod and both ends of the Y-rod.

15 Claims, 12 Drawing Sheets

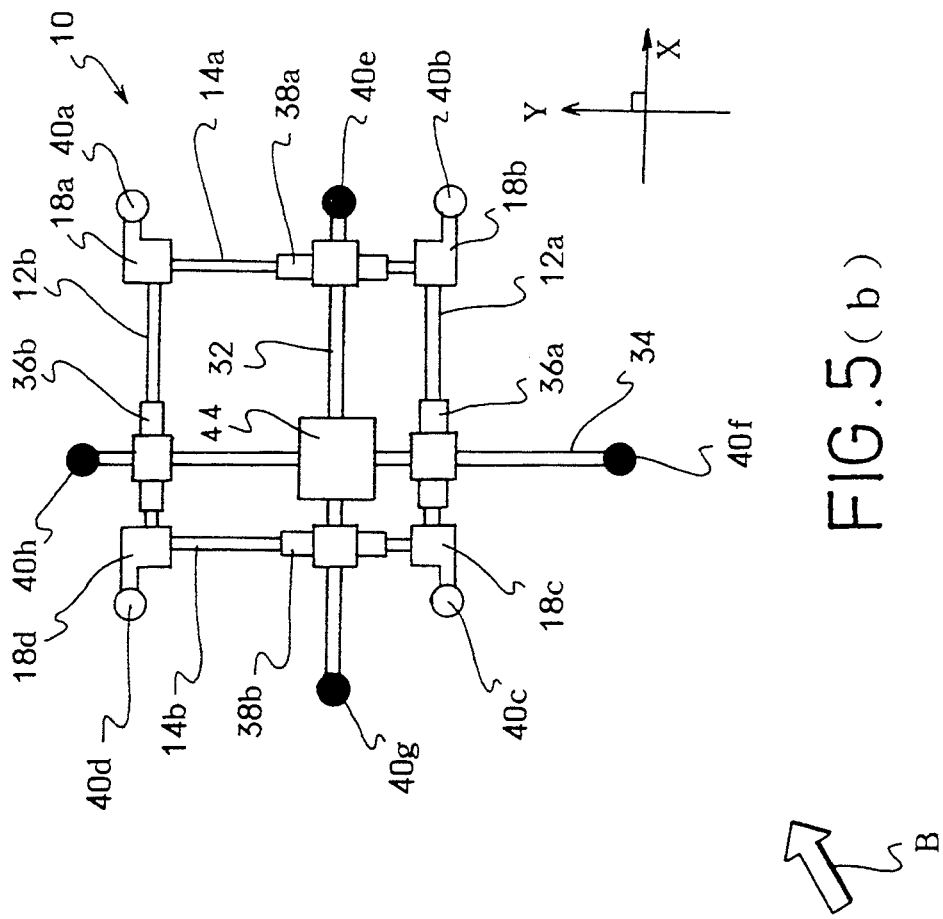
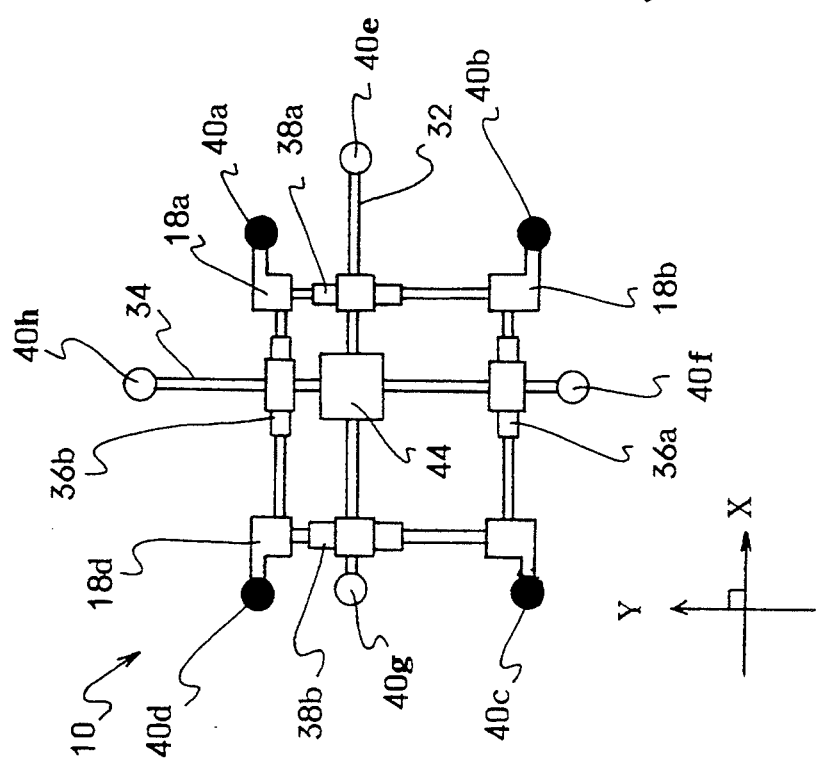
FIG.5(a)
FIG.5(b)

WALKING ROBOT

BACKGROUND OF THE INVENTION

The present invention relates to a walking robot. Conventionally, conveying robots are used for conveying loads. The conventional robots have tires or crawlers as means for moving themselves. In some laboratories, walking robots having two or four legs are operated by driving pulse motors.

However, the conventional robots have the following disadvantages.

Firstly, in the case of the robots having tires or crawlers as the means for moving, if there are obstructions in their courses, they must change their courses. Thus, if the robot is in a narrow path, it cannot avoid an obstruction.

On the other hand, in the case of the walking robots having two or four legs, unbalanced states with one or three legs must occur while walking, so it is very difficult to control balance. Therefore, the walking robots having two or four legs are not practically used.

SUMMARY OF THE INVENTION

An object of the present invention is to provide a walking robot, which is capable of easily avoiding obstructions and easily balancing while walking.

To achieve the object, the walking robot of the present invention comprises:

a pair of X-guides provided parallel in an X-direction;

a pair of Y-guides provided parallel in a Y-direction; perpendicular to the X-direction;

four corner blocks for connecting each end of the X-guides and the Y-guides;

a pair of X-travellers being capable of moving in the X-direction along the X-guides;

a pair of Y-travellers being capable of moving in the Y-direction along the Y-guides;

an X-rod being provided in the X-direction, the X-rod being pierced through the Y-travellers;

a Y-rod being provided in the Y-direction, the Y-rod being pierced through the X-travellers, the Y-rod being connected to the X-rod;

X-driving means for moving the X-travellers in the X-direction;

Y-driving means for moving the Y-travellers in the Y-direction; and a plurality of Z-driving means for moving the corner blocks, the X-travellers and the Y-travellers in a Z-direction perpendicular to the X- and Y-directions, the Z-driving means being provided on the corner blocks, both ends of the X-rod and both ends of the Y-rod.

Since the walking robot of the present invention has plurality of the Z-driving means, which are capable of moving the corner blocks and the X- and Y-travellers in the Z-direction, the corner blocks, the X- and Y-travellers and other elements connected to them can be vertically moved by driving the Z-driving means, so that the walking robot is able to avoid obstructions without changing course. Since the Z-driving means connected to the legs are provided on the corner blocks and each end of the X- and Y-rods, which are located on the outermost positions of the walking robot, they are capable of stably supporting the body thereof while walking. Therefore, it is very easy to control the balance of the walking robot, so the load of the computer can be reduced. Thus, a walking robot with high performance can be realized.

Further scope of applicability of the present invention will become apparent from the detailed description given hereinafter. However, it should be understood that the detailed description and specific examples, while indicating preferred only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

Embodiments of the present invention will now be described by way of examples and with reference to the accompanying drawings, in which:

FIG. 5(a) and FIG. 5(b) are plan views showing how to diagonally walk;

DETAILED DESCRIPTION OF THE PREFERRED EMBODIES

Preferred embodiments of the present invention will now be described.

The first embodiment will be explained with reference to FIGS. 1-10.

Firstly, the basic structure will be explained with reference to FIGS. 1-3.

Figure 1:
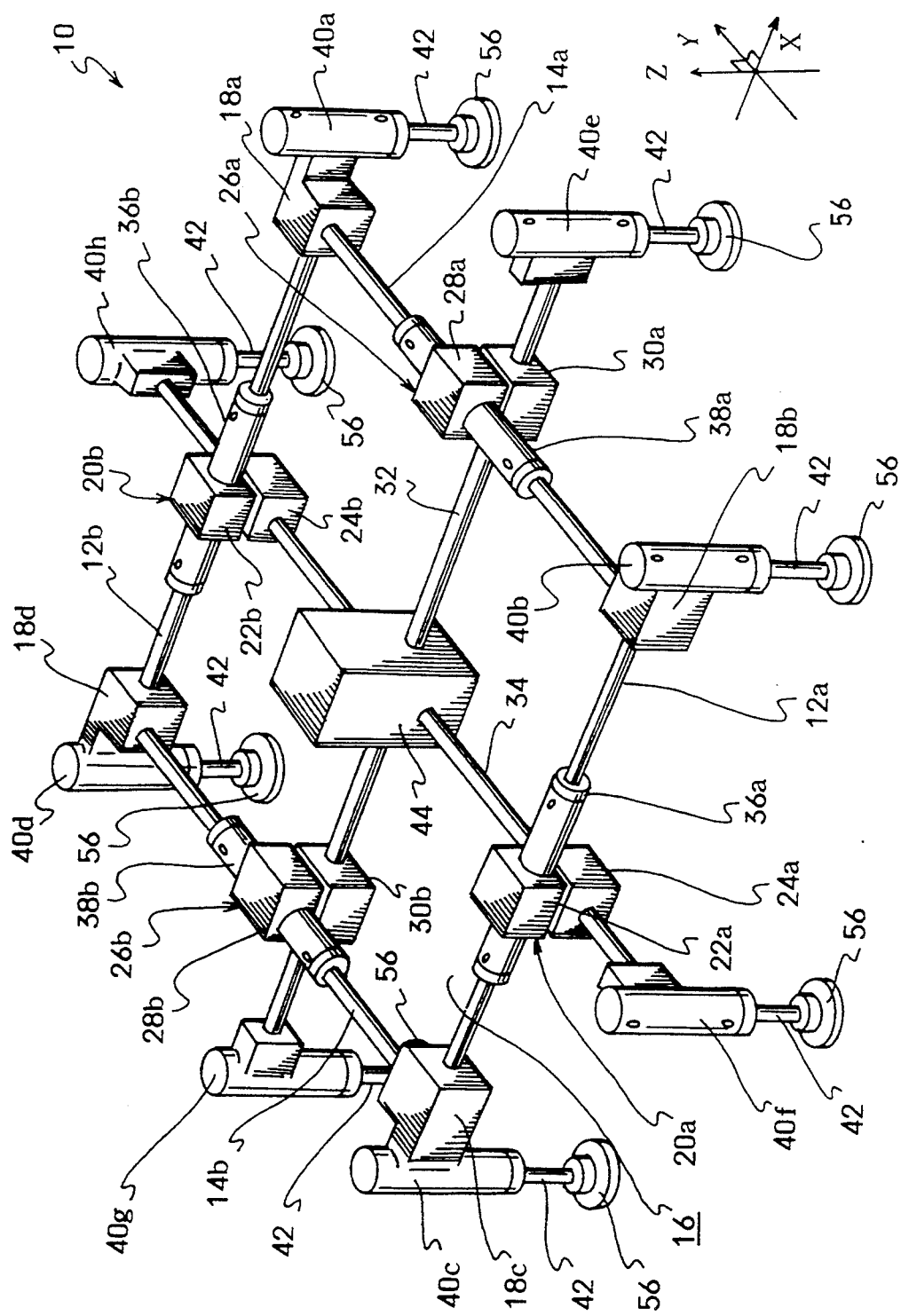
FIG. 1 is a perspective view of the walking robot: of a first embodiment of the present invention.
Figure 2:
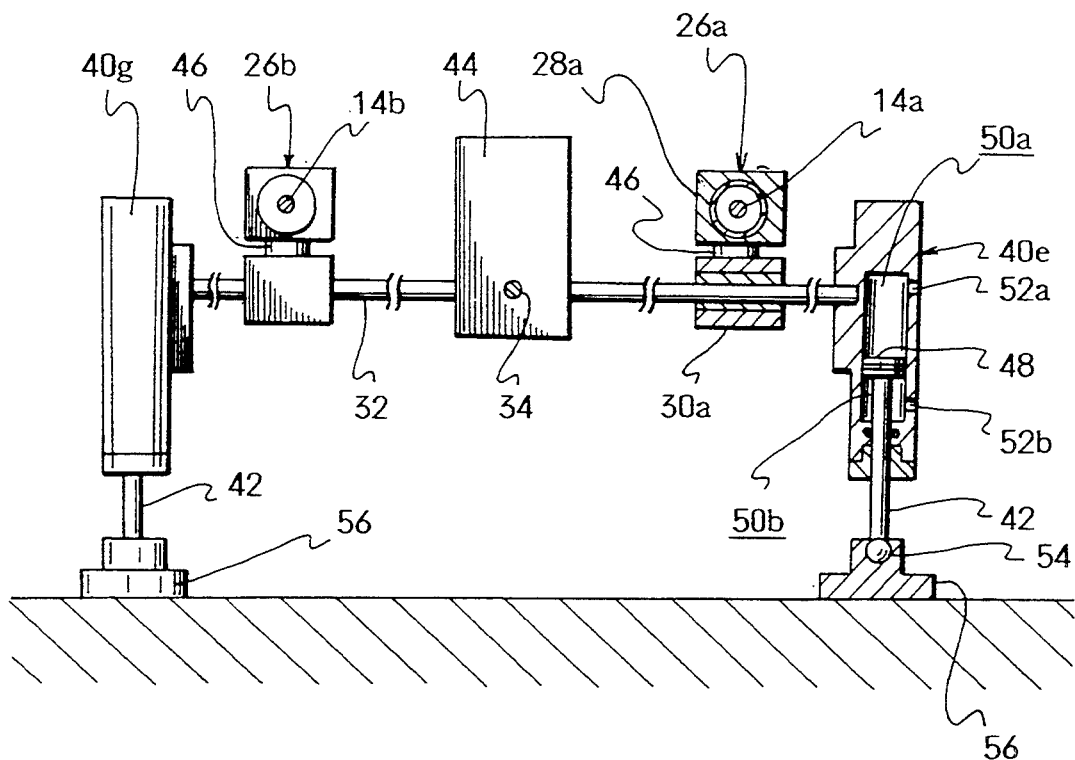
FIG. 2 is a partial sectional view showing an X-traveller, a Y-traveller, and a Z-cylinder unit.

In FIG. 1, X-guides 12a and 12b are provided parallel in an X-direction with a predetermined clearance. The X-guides 12a and 12b are metal shafts in the present embodiment.

Y-guides 14a and 14b are provided parallel in a Y-direction, which is perpendicular to the X-direction, with a predetermined clearance. The Y-guides 14a and 14b are also metal shafts in the present embodiment. The X-guides 12a and 12b and the Y-guides 14a and 14b form a horizontal rectangular plane 16.

Corner blocks 18a, 18b, 18c and 18d are respectively provided on each corner of the rectangular plane 16. Each end of the X-guides 12a and 12b and the Y-guides 14a and 14b is fixed to the corner blocks 18a, 18b, 18c and 18d. Upper faces of the corner blocks 18a, 18b, 18c and 18d are formed into planes, X-travellers 20a and 20b respectively have first X-traveller constituting members 22a and 22b on an upper side and second X-traveller constituting members 24a and 24b on a lower side, The X-travellers 20a and 20b are capable of moving in the X-direction along the X-guides 12a and 12b.

Y-travellers 26a and 26b respectively have first Y-traveller constituting members 28a and 28b on an upper side and second Y-traveller constituting members 30a and 30b on a lower side, The Y-travellers 26a and 26b are capable of moving in the Y-direction along the Y-guides 14a and 14b, An X-rod 32 is provided in the X-direction and pierced through the Y-travellers 26a and 26b. Both ends of the X-rod 32 projects outwardly from the Y-travellers 26a 26b. The X-rod 32 is a metal shaft in the present embodiment.

A Y-rod 34 is provided in the Y-direction and pierced through the X-travellers 20a and 20b. Both ends of the Y-rod 32 are projected outward from the X-travellers 20a and 20b. The Y-rod 34 is also a metal shaft in the present embodiment. A crossing section of the X-rod 32 and the Y-rod 34 is connected by, for example, welding.

X-cylinder units 36a and 36b, which are an example of X-driving means, are respectively provided on the X-travellers 20a and 20b. The X-cylinder units 36a and 36b are capable of moving the X-travellers 20a and 20b in the X-direction.

Y-cylinder units 38a and 38b, which are an example of Y-driving means, are respectively provided to the Y-travellers 26a and 26b. The Y-cylinder units 38a and 38b are capable of moving the Y-travellers 26a and 26b in the Y-direction.

Z-cylinder units 40a, 40b, 40c, 40d, 40e, 40f, 40g and 40h are an example of Z-driving means. The Z-cylinder units 40a, 40b, 40c, 40d, 40e, 40f, 40g and 40h are capable of working as legs of the walking robot 10. The Z-cylinder units 40a, 40b, 40c and 40d are respectively provided on outer parts of the corner blocks 18a, 18b, 18c and 18d, and fixed thereto. On the other hand, the Z-cylinder units 40e, 40f, 40g and 40h are respectively provided on the ends of the X-rod 32 and the Y-rod 34. The corner blocks 18a, 18b, 18c and 18d, the X-travellers 20a and 20b, and the Y-travellers 26a and 26b can be moved in the Z-direction by extending and retracting cylinder rods 42 of the Z-cylinder units 40a, 40b, 40c, 40d, 40e, 40f, 40g and 40h. Namely, the walking robot 10 can be moved in the vertical direction by extending and retracting the cylinder rods 42 thereof.

A slider 44, which is an example of a mounting section., is fixed at the crossing section of the X-rod 32 and the Y-rod 34. Tools, robot heads for machining, measuring equipments, works to be machined, etc. can be mounted on and attached to the slider 44.

Structures of the X-travellers 20a and 20b, the Y-travellers 26a and 26b, and the Z-cylinder units 40a, 40b, 40c, 40d, 40e, 40f, 40g and 40h will be explained with reference to FIG. 2. Note that, the X-travellers 20a and 20b and the Y-travellers 26a and 26b have basically the same structure, so the structure of the Y-traveller 26a will be explained. And the Z-cylinder units 40a, 40b, 40c, 40d, 40e, 40f, 40g and 40h also have basically the same structure, so the structure of the Z-cylinder unit 40e will be explained.

Firstly, the Y-traveller 26a will be explained.

The Y-traveller 26a has a first Y-traveller constituting member 28a, which can be moved on the Y-guide 14a in the Y-direction by the Y-cylinder unit 38a, and a second Y-traveller constituting member 30a, through which the X-rod 32 is pierced. The first Y-traveller constituting member 28a and the second Y-traveller constituting member 30a are rotatably connected by a shaft 46. Note that, the X-traveller 26a (26b) has a first X-traveller constituting member, which can be moved on the X-guide in the X-direction by the X-cylinder unit, and a second X-traveller constituting member, through which the Y-rod 34 is pierced. And the first and the second X-traveller constituting members are rotatably connected to each other.

Next, the Z-cylinder unit 40e will be explained.

An inner space of the Z-cylinder unit 40e is divided into air chambers 50a and 50b by a piston section 48, which is provided at a top end of the cylinder rod 42. When compressed air is introduced into the air chamber 50a via an air-port 52a from a compressor (not shown), the cylinder rod 42 is extended. On the other hand, when compressed air is introduced into the air chamber 50b via an air port 52b from the compressor, the cylinder rod 42 is retracted. There is provided a foot section 56, which includes a universal joint 54 as an ankle, at a lower end of the cylinder rod 42. The foot section 56 comes into contact with the earth surface when the cylinder rod 42 is extended downward; the foot section 56 leaves from the earth surface when the cylinder rod 42 is retracted upward. Note that, a vacuum pad can be used instead of a disk of the foot section 56 according to fields of usage. Distance measuring sensors, which are capable of measuring the distance between the foot section 56 and the earth surface, may be provided on the Z-cylinder units 40a, 40b, 40c, 40d, 40e, 40f, 40g and 40h. Thus, an upper face of the slider 44 and the upper faces of the corner blocks 18a, 18b, 18c and 18d can be maintained horizontally by measuring the distance between each foot section 56 and the earth surface and controlling the length of each cylinder rod 42.

Figure 3:
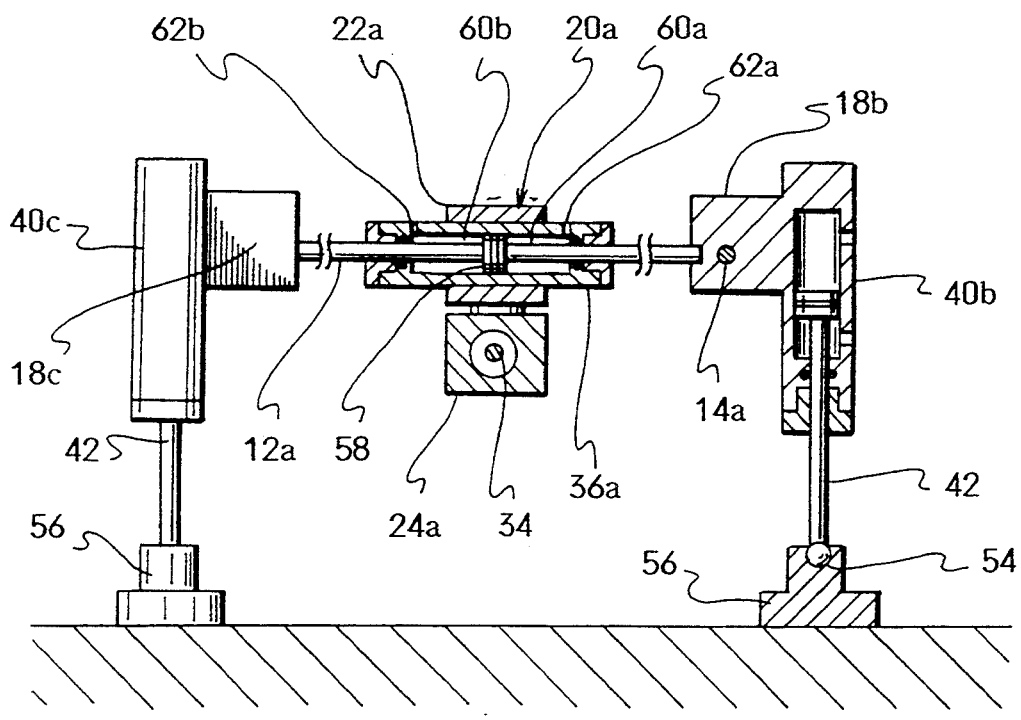
FIG. 3 is a partial sectional view of an X-cylinder unit and a Y-cylinder unit.

Successively, structures of the X-cylinder units 36a and 36b and the Y-cylinder units 38a and 38b with reference to FIG. 3. Note that, the X-cylinder units 36a and 36b and the Y-cylinder units 38a and 38b have basically the same structure, so the structure of the X-cylinder unit 36a will be explained.

The X-guide 12a is pierced through the X-cylinder unit 36a. There is formed a large diameter section 58 in a mid-section of the X-guide 12a. The large diameter section 58 divides an inner space of the X-cylinder unit 36a into air chambers 60a and 60b. When compressed air is introduced into the air chamber 60a via an air port 62a, the X-cylinder unit 36a and the X-traveller 20a moves rightward. On the other hand, when compressed air is introduced into the air chamber 60b via an air port 62, i the X-cylinder unit 36a and the X-traveller 20a moves leftward.

Next, actions of the walking robot 10 will be explained with reference to FIGS. 4(a)–6(b). Note that, black circles (●) in the drawings indicate the Z-cylinder units 40a, 40b, 40c, 40d, 40e, 40f, 40g and 40h whose foot sections 56 contact the earth surface; white circles (◯) in the drawings indicate the Z-cylinder units 40a, 40b, 40c, 40d, 40e, 40f, 40g and 40h whose foot sections 56 do not contact the earth surface.

Firstly, linear walking will be explained with reference to FIGS. 4(a) and 4(b).

Figure 4A:
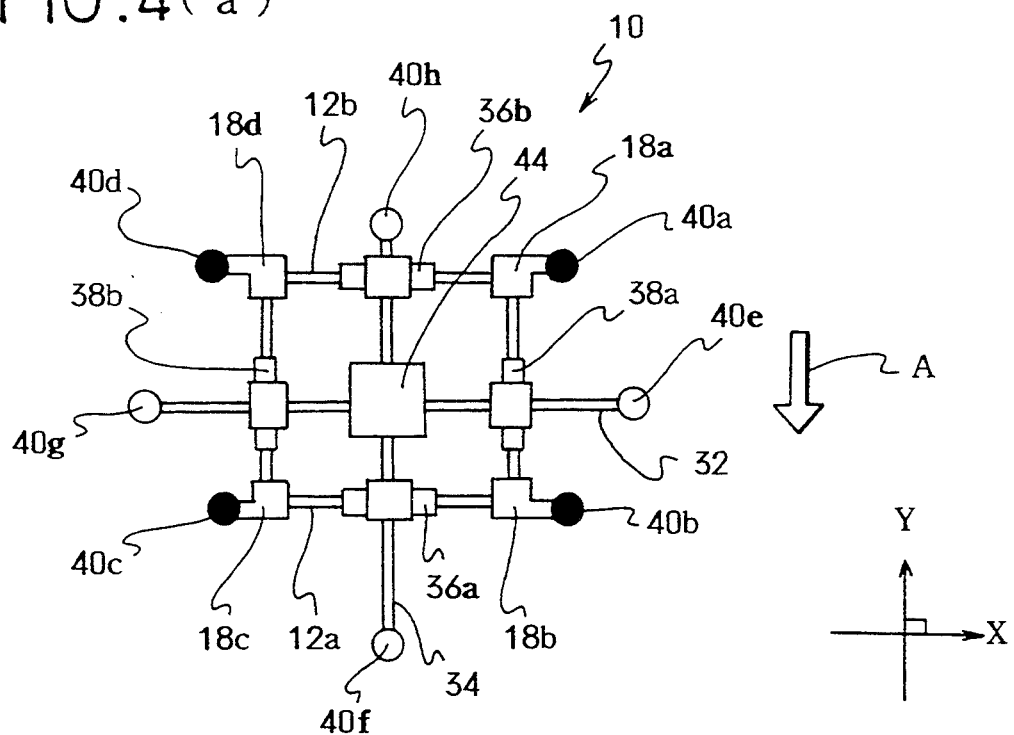
FIG. 4(a) and FIG. 4(b) are plan views showing how to linearly walk.
Figure 4B:
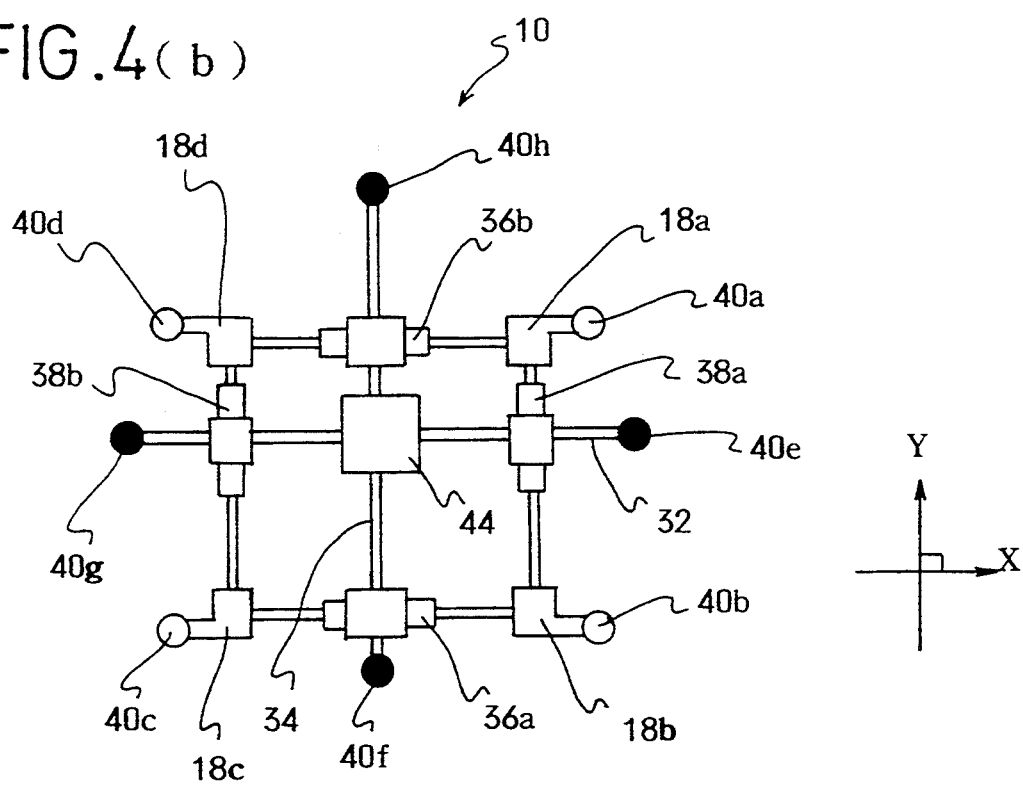

In FIG. 4(a), the foot sections 56 of the Z-cylinder units 40a, 40b, 40c and 40d contact the earth surface. To move the walking robot 10 in the direction of an arrow A, the Y-cylinder units 38a and 38b are driven so as to move the Y-cylinder units 38a and 38b toward the corner blocks 18b and 18c. By moving the Y-cylinder units 38a and 38b toward the corner blocks 18b and 18c, the X-rod 32, the Y-rod 34 and the slider 44 move in the direction of the arrow A (see FIG. 4(a)) .

Next, the foot sections 56 of the Z-cylinder units 40e, 40f, 40g and 40h contact the earth surface, then the foot sections 56 of the Z-cylinder units 40a, 40b, 40c and 40d leave from the earth surface. In this state, the Y-cylinder units 38a and 38b are driven so as to move relative to the Y-cylinder units 38a and 38b close to the corner blocks 18a and 18d. Thus, the X-guides 12a and 12b, the Y-guides 14a and 14b and the corner blocks 18a, 18b, 18c and 18d move in the direction of the arrow A (see FIG. 4(b)). By repeating the above described steps, the walking robot 10 is capable of linearly moving in the direction of the arrow A. In FIGS. 4(a) and 4(b), the walking robot 10 is moved in the direction of the arrow A (in the Y-direction), while the walking robot 10 can be moved in the X-direction by driving the X-cylinder units 36a and 36b.

Next, diagonal walking will be explained with reference two FIGS. 5(a) and 5(b).

In FIG. 5(a), the foot sections 56 of the Z-cylinder units 40e, 40f, 40g and 40h contact the earth surface. To diagonally move the walking robot 10 in the direction of an arrow B, the X-cylinder units 36a and 36b are driven so as to move the X-cylinder units 36a and 36b toward the corner blocks 18a and 18b. Simultaneously, the Y-cylinder units 38a and 38b are driven so as to move the Y-cylinder units 38a and 38b toward the corner blocks 18a and 18d. With these actions, the X-rod 32, the Y-rod 34 and the slider 44 are capable of diagonally walking in the direction of the arrow B (see FIG. 5(a)).

Successively, the foot sections 56 of the Z-cylinder units 40e, 40f, 40g and 40h contact the earth surface, then the foot sections 56 of the Z-cylinder units 40a, 40b, 40c and 40d leave from the earth surface. In this state, the X-cylinder units 36a and 36b are driven so as to relatively move the X-cylinder units 36a and 36b close to the corner blocks 18c and 18d. Simultaneously, the Y-cylinder units 38a and 38b are driven so as to relatively move the Y-cylinder units 38a and 38b close to the corner blocks 18b and 18c. Thus, the X-guides 12a and 12b, the Y-guides 14a and 14b and the corner blocks 18a, 18b, 18c and 18d move in the direction of the arrow B (see FIG. 5(b)). By repeating the above described steps, the walking robot 10 is capable of diagonally moving in the direction of the arrow B.

Next, turning (changing direction) will be explained with reference to FIGS. 6(a) and 6(b).

Figure 6A:
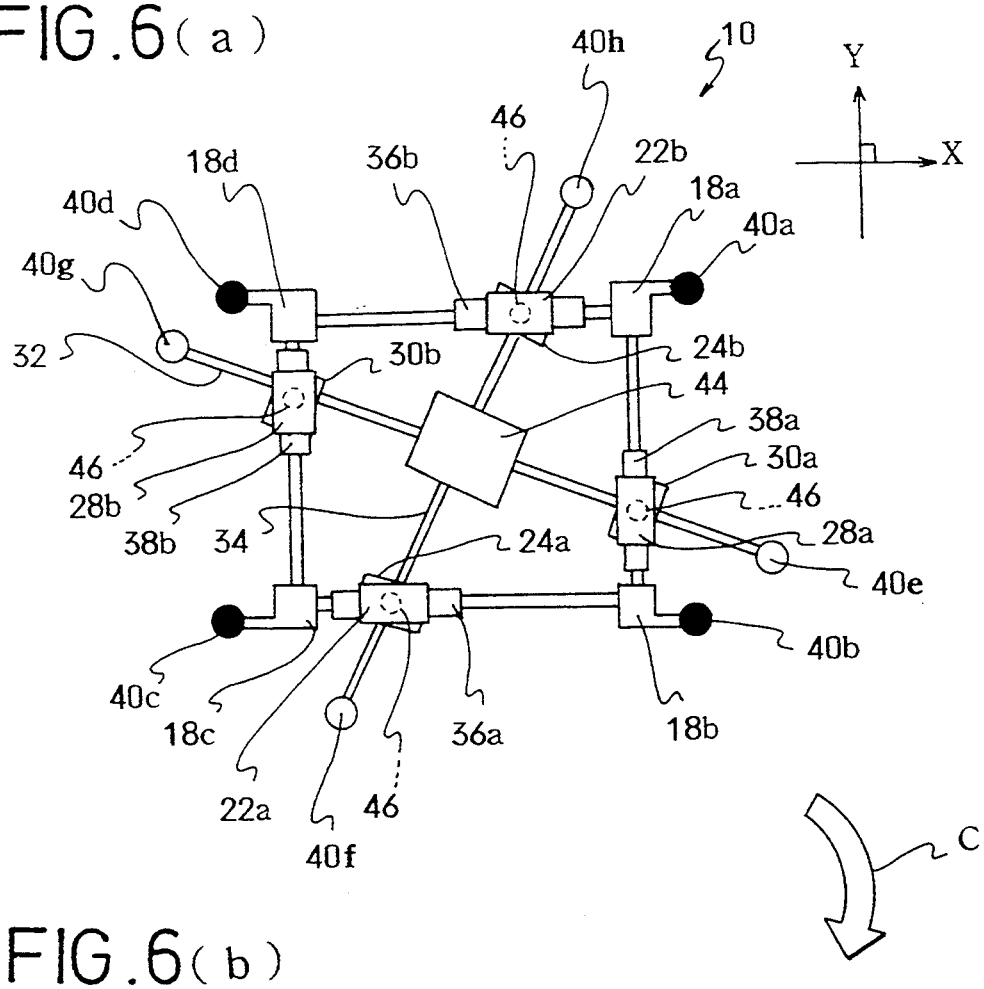
FIG. 6(a) and FIG. 6(b) are plan views showing how to turn.

In FIG. 6(a), the foot sections 56 of the Z-cylinder units 40a, 40b, 40c and 40d contact the earth surface. To turn the walking robot 10 in the direction of an arrow C, the X-cylinder units 36a and 36b are driven so as to move the X-cylinder unit 36a toward the corner block 18c and to move the X-cylinder unit 36b toward the corner block 18a. Simultaneously, the Y-cylinder units 38a and 38b are driven so as to move the Y-cylinder unit 38a toward the corner block 18b and to move the Y-cylinder unit 38b toward the corner block 18d. During the action, the first X-traveller constituting member 22a relatively rotates about the shaft 46 with respect to the second X-traveller constituting member 24a; the first X-traveller constituting member 22b relatively rotates about the shaft 46 with respect to the second X-traveller constituting member 24b; the first Y-traveller constituting member 28a relatively rotates about the shaft 46 with respect to the second Y-traveller constituting member 30a; and the first Y-traveller constituting member 28b relatively rotates about the shaft 46 with respect to the second Y-traveller constituting member 30b. Therefore, the X-rod 32, the Y-rod 34 and the slider 44 are turned in the direction of the arrow C (see FIG. 6(a)).

Successively, the foot sections 56 of the Z-cylinder units 40e, 40f, 40g and 40h contact the earth surface, then the foot sections 56 of the Z-cylinder units 40a, 40b, 40c and 40d leave from the earth surface. In this state, the X-cylinder units 36a and 36b are driven so as to relatively move the X-cylinder units 36a and 36b toward the center of the X-guides 12a and 12b. Simultaneously, the Y-cylinder units 38a and 38b are driven so as to relatively move the Y-cylinder units 38a and 38b toward the center of the Y-guides 14a and 14b. Then the X-guides 12a and 12b, the Y-guides 14a and 14b and the corner blocks 18a, 18b, 18c and 18d are turned, so that the walking robot 10 can be turned in the direction of the arrow C (see FIG. 6(b)). By repeating above described steps, the walking robot 10 is capable of further turning in the direction of the arrow C. Note that, the angle of turning can be controlled by adjusting the relative strokes of the X-cylinder units 36a and 36b with respect to the X-guides 12a and 12b and the relative strokes of the Y-cylinder units 38a and 38b with respect to the Y-guides 14a and 14b.

Next, examples of using the walking robot 10 as a two dimensional drive system will be explained with reference to FIGS. 7 and 8.

Figure 7:
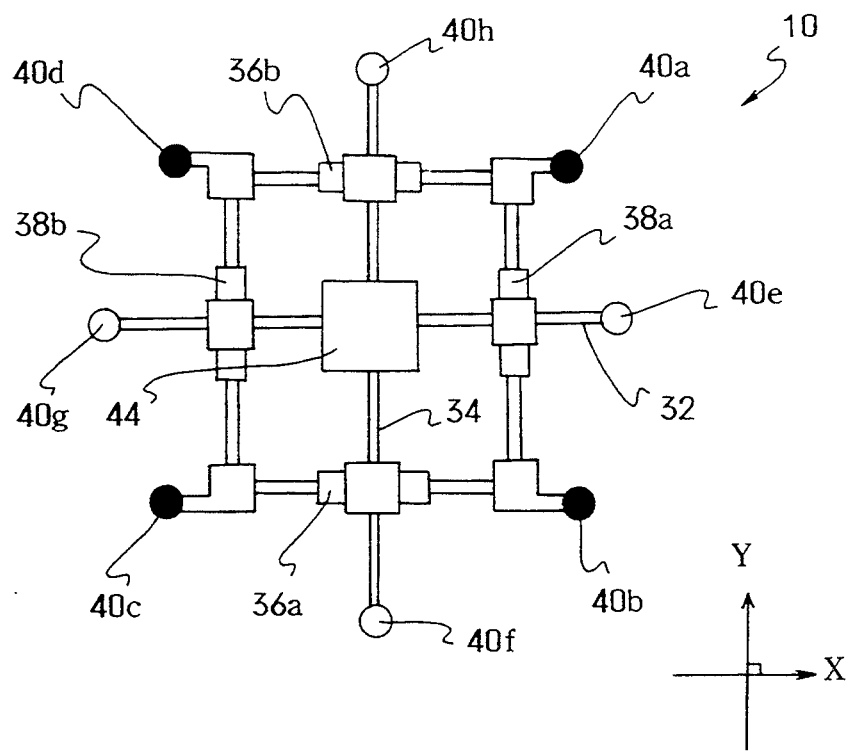
FIG. 7 is a plan view showing how to use the walking robot as a two dimensional drive system.

In FIG. 7, the foot sections 56 of the Z-cylinder units 40a, 40b, 40c and 40d contact the earth surface, and the foot sections 56 of the Z-cylinder units 40e, 40f, 40g and 40h leave therefrom. In this state, the X-cylinder units 36a and 36b are driven in the same direction, and the the Y-cylinder units 38a and 38b are driven in the same direction. Then the X-rod 32, the Y-rod 34 and the slider 44 can be moved in a plane as a two dimensional drive system. Therefore, for example, tools attached to the slider 44 can be moved in the plane.

Figure 8:
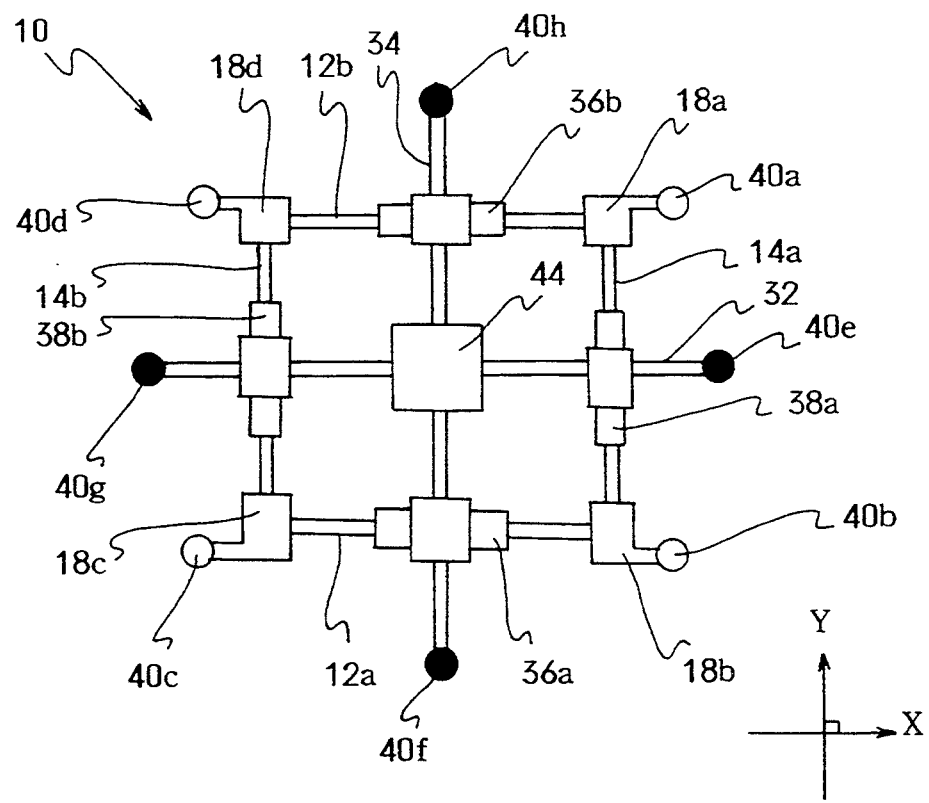
FIG. 8 is a plan view showing how to use the walking robot as a two dimensional drive system.

In FIG. 8, the foot sections 56 of the Z-cylinder units 40e, 40f, 40g and 40h contact the earth surface, and the foot sections 56 of the Z-cylinder units 40a, 40b, 40c and 40d leave therefrom. In this stage, the X-cylinder units 36a and 36b are driven so as to move the X-guides 12a and 12b in the same direction, and the the Y-cylinder units 38a and 38b are driven so as to move the Y-guides 14a and 14b in the same direction. Then the X-guides 12a and 12b, the Y-guides 14a and 14b and the corner blocks 18a, 18b, 18c and 18d can be moved in a plane as a two dimensional drive system. Therefore, for example, tools attached to the corner blocks 18a, 18b, 18c and 18d can be moved in the plane.

Figure 6B:
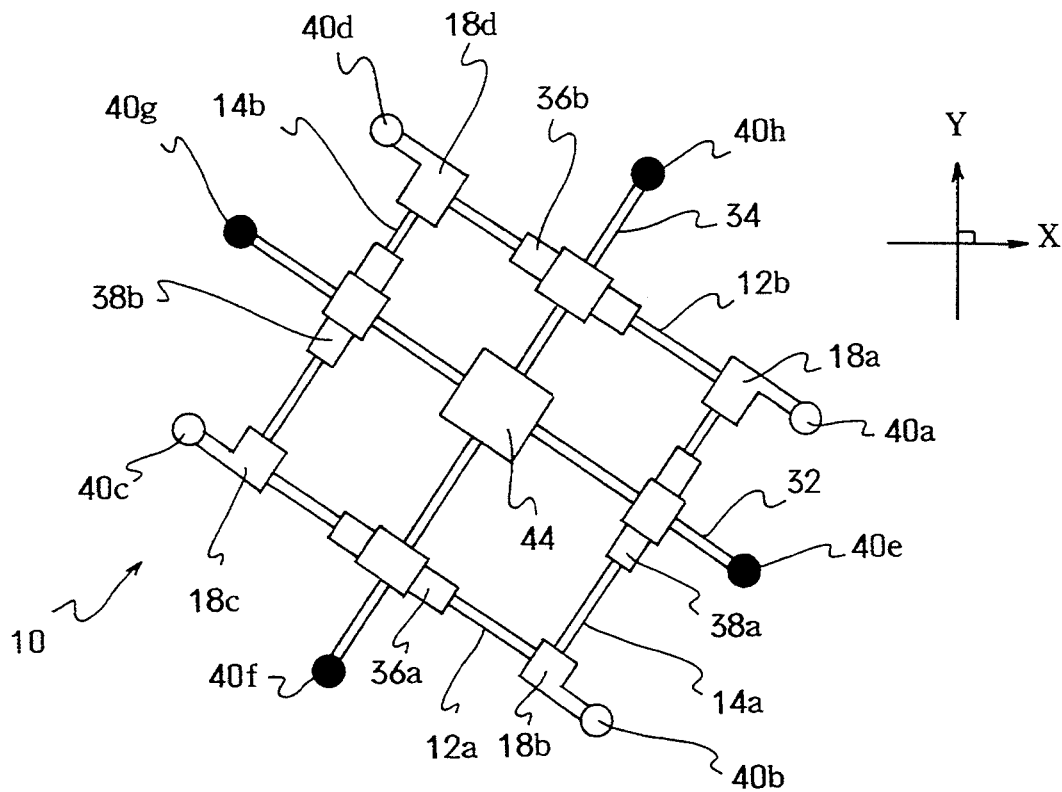

Furthermore, if the turning action described with FIGS. 6(a) and 6(b) and/or the vertical action by driving the Z-cylinder units 40a, 40b, 40c and 40d or the Z-cylinder units 40e, 40f, 40g and 40h are added to the two dimensional drive systems shown in FIGS. 7 and 8, drive systems having multiple function can be realized.

Successively, examples of using the walking robot 10 will be explained with reference to FIGS. 9–11.

Figure 9:
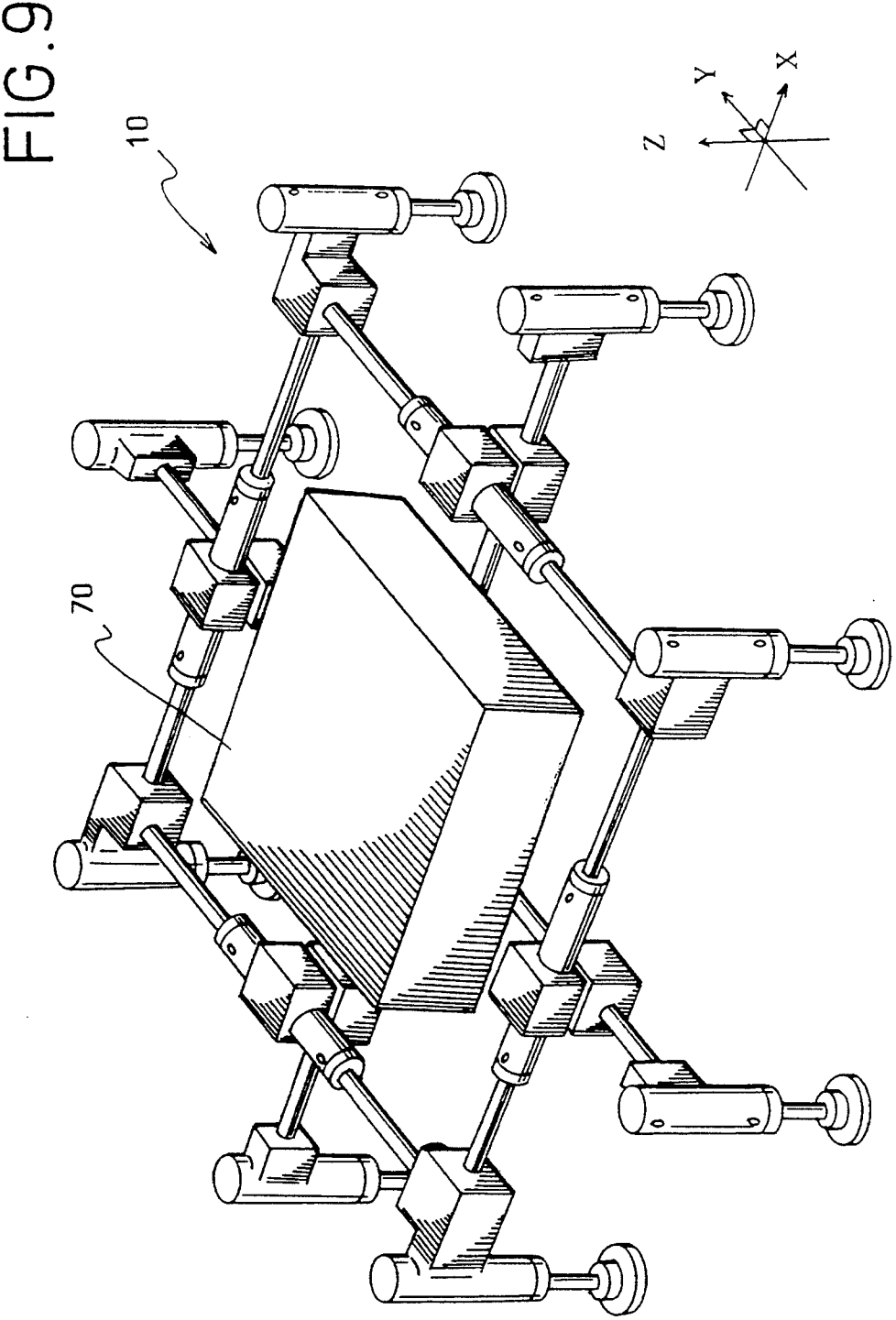
FIG. 9 is a perspective view showing an example of using the walking robot.

In FIG. 9, a load 70 is mounted on the slider 44. The load 70 is carried by the walking robot 10. There is provided means for holding the load 70 (not shown) to the slider 44.

Figure 10:
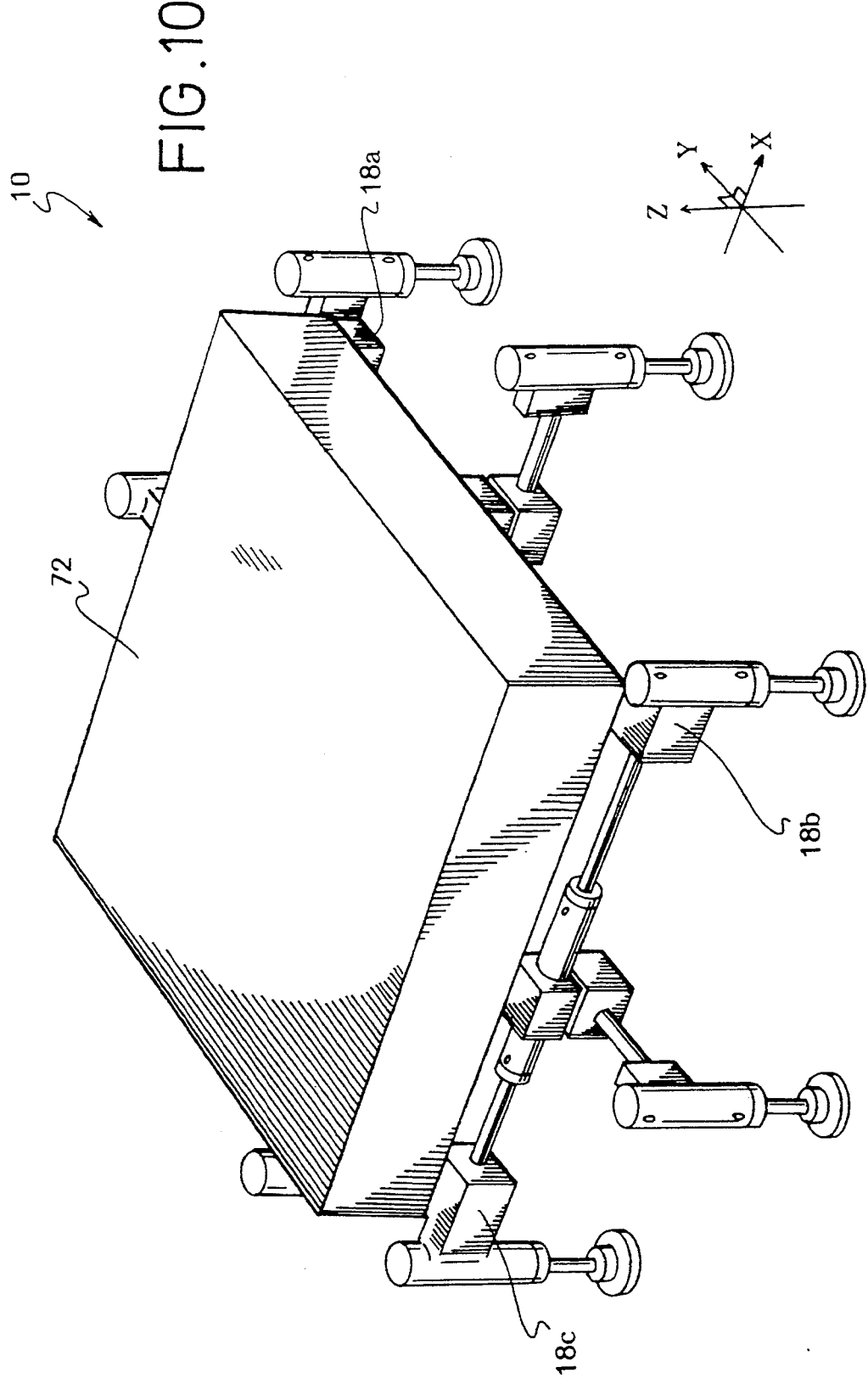
FIG. 10 is a perspective view showing an example of using the walking robot.

In FIG. 10, a large and heavy load 72 is mounted on the corner blocks 18a, 18b, 18c and 18d. The load 72 is carried by the walking robot 10. There are provided a plurality of means for holding the load 72 (not shown) to the corner blocks 18a, 18b, 18c and 18d. In this case, no slider 44 is required.

Figure 11:
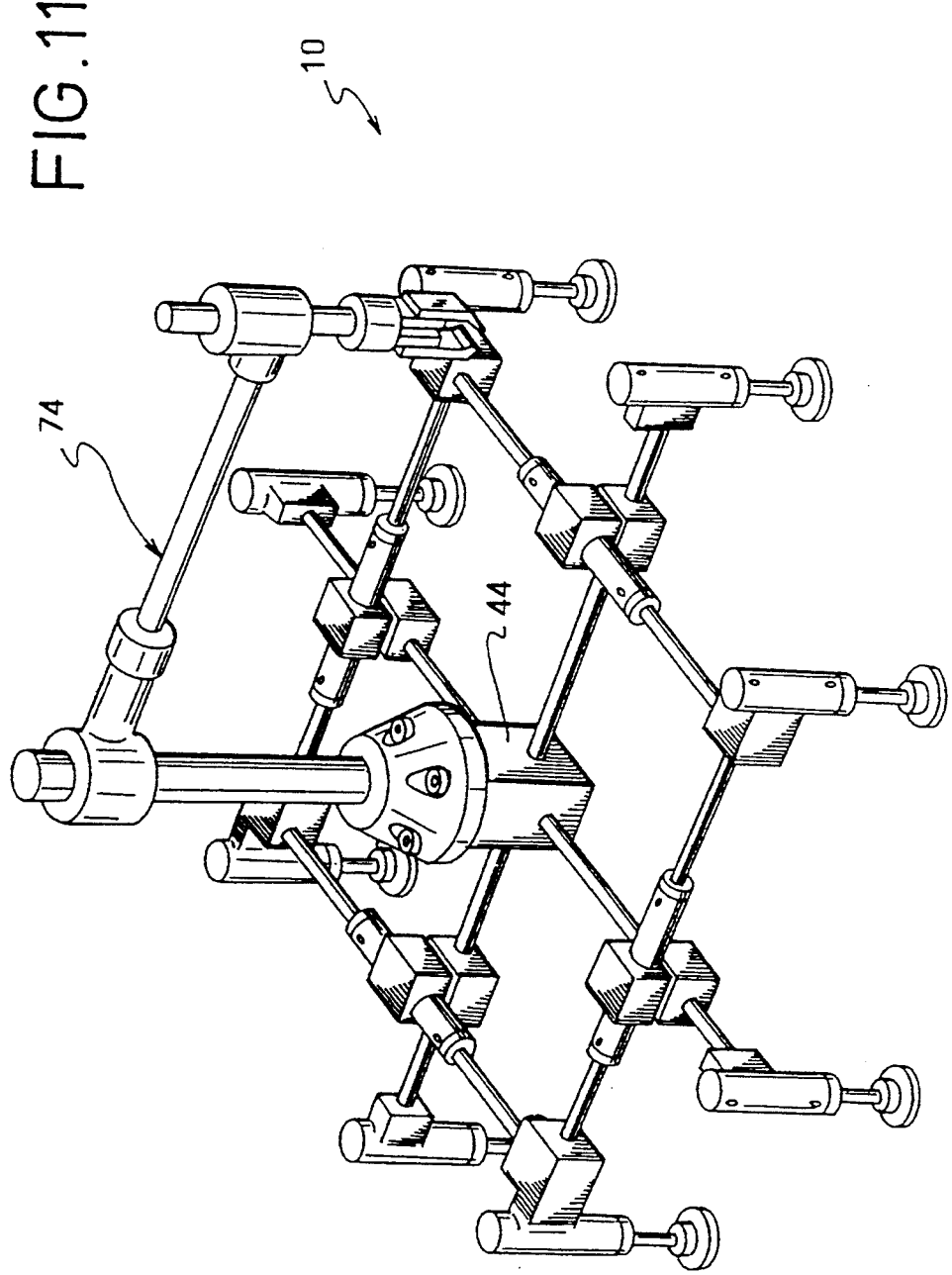
FIG. 11 is a perspective view showing an example of using the walking robot.

In FIG. 11, a working robot 74 is mounted and fixed on the slider 44. The robot 74 is carried by the walking robot 10. Since the basic function of the walking robot 10 and the function of the drive system, which is described with FIGS. 7 and 8 are added to the function of the robot 74, a multifunction walking robot 10 can be realized.

Figure 12:
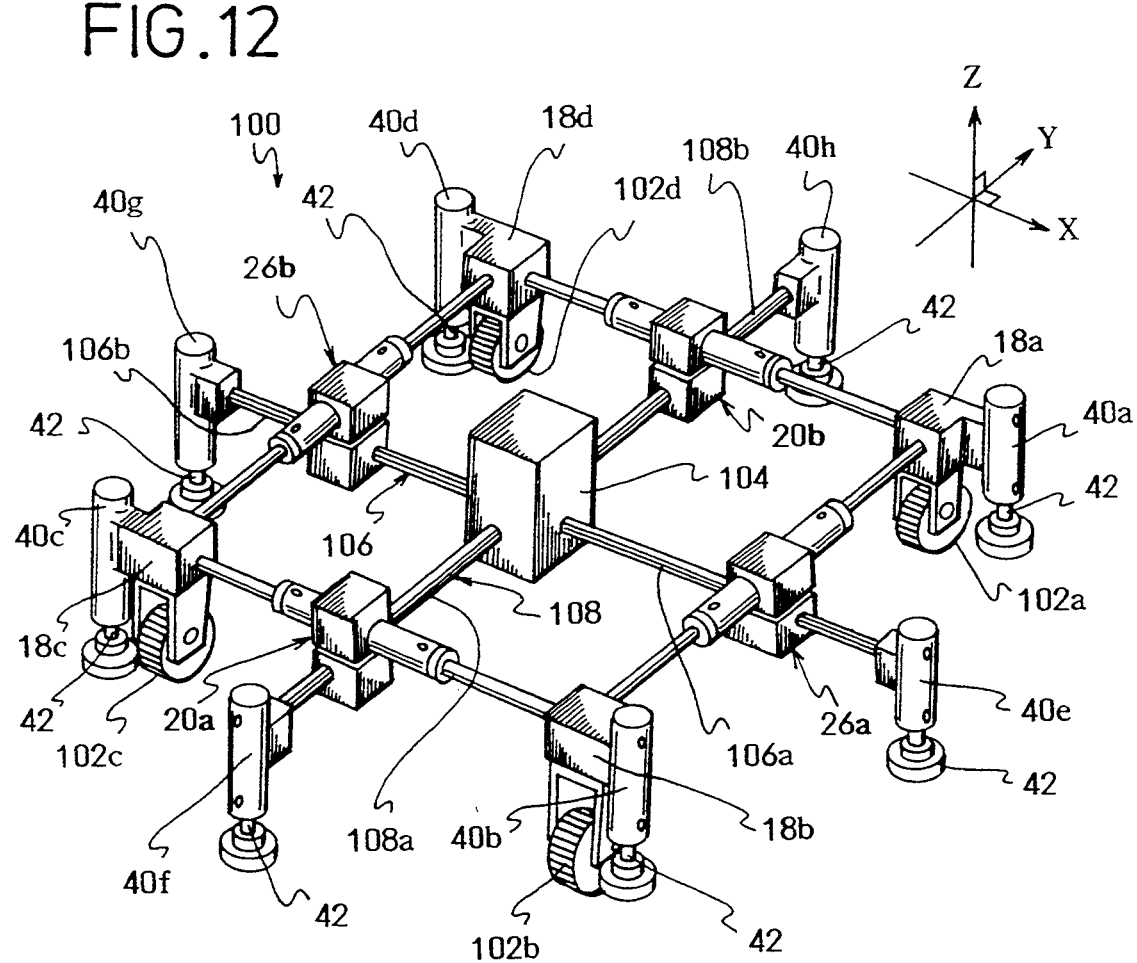
FIG. 12 is a perspective view of the walking robot of a second embodiment of the present invention.
Figure 13:
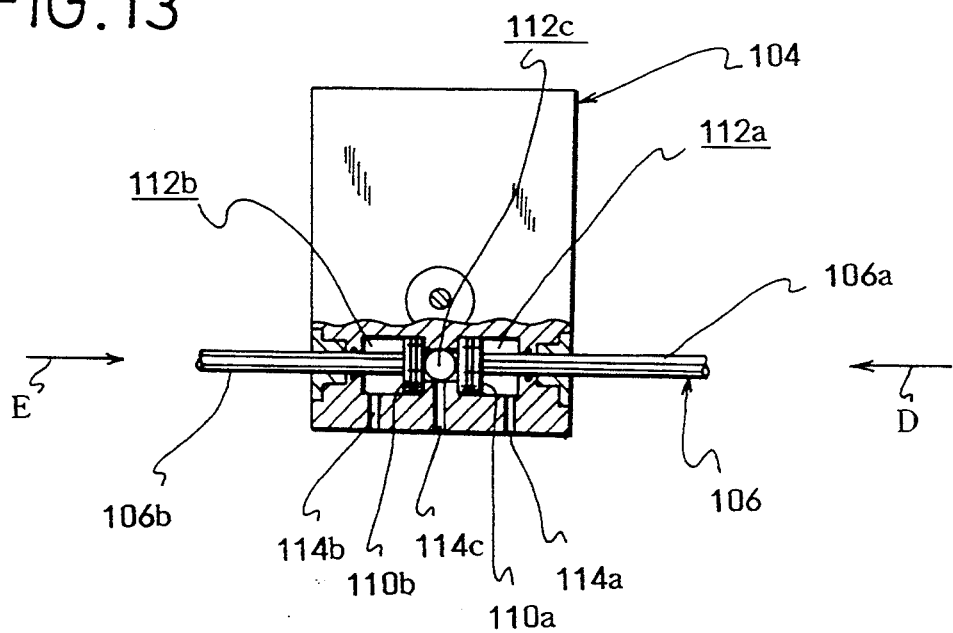
FIG. 13 is a partial sectional view of a retracting mechanism of the Z-cylinder unit of the second embodiment.

The second embodiment will be explained with reference to FIGS. 12 and 13. Note that, the second embodiment is a modified embodiment of the first embodiment, so elements, which have described in the first embodiment, will be assigned the same symbols and explanation will be omitted.

The walking robot 10 of the first embodiment always moves by walking. However, in case of moving the walking robot 10 to a remote position, it takes a long time if only walking is utilized. To solve the disadvantage, a walking robot 100 of the second embodiment has rollers 102a, 102b, 102c and 102d, which are respectively provided on each lower section of the corner blocks 18a, 18b, 18c and 18d. The rollers 102a, 102b, 102c and 102d are capable of touching on the ground when the cylinder rods 42 of the Z-cylinder units 40a, 40b, 40c, 40d, 40e, 40f, 40g and 40h are restricted. Heading of the rollers 102a, 102b, 102c and 102d are capable of changing so as to turn the walking robot 100.

In the second embodiment, when the walking robot 100. conveyed on an even road or a plane field, the walking robot 100 is joined to a traction vehicle, and runs to a destination by the rollers 102a, 102b, 102c and 102d. Note that, the walking robot 100 may have means for rotating the rollers 102a, 102b, 102c and 102d, e.g., an engine, a motor.

In case of running the walking robot 100 by the rollers 102a, 102b, 102c and 102d, outward projected length of the Z-cylinder units 40e, 40f, 40g and 40h should be as short as possible. Then the walking robot 100 of the second embodiment has a retracting mechanism of the Z-cylinder units 40e, 40f, 40g and 40h.

The retracting mechanism comprises a slider 104; an X-rod 106 having X-rod constituting members 106a and 106b, which are capable of being retracted into the slider 104; and a Y-rod 108 having Y-rod constituting members 108a and 108b, which are capable of being retracted into the slider 104. Structures of the X-rod 106 and the Y-rod 108 with respect to the slider 104 are substantially the same, so the structure of the slider 104 and the X-rod 106 will be explained with reference to FIG. 13.

A through-hole is bored through the slider 104 in the X-direction. The X-rod constituting members 106a and 106b are inserted in the through-hole. The X-rod constituting members 106a and 106b are prevented from rotating about their axes by, for example, spline grooves and spline nuts engaging with the spline grooves. There are provided piston sections 110a and 110b at each inner end of the X-rod constituting members 106a and 106b. The piston sections 110a and 110b divides an inner space of the through-hole into air chambers 112a, 112b and 112c. When compressed air is introduced into the air chambers 112a and 112b via air ports 114a and 114b, the X-rod constituting members 106a and 106b are respectively moved in directions of arrows D and E, so that the Z-cylinder units 40e and 40g, which are respectively provided at outer ends of the X-rod constituting members 106a and 106b, are moved close to the Y-travellers 26a and 26b and retracted. On the other hand, when compressed air is introduced into the air chamber 112c via an air-port 112c, the X-rod constituting members 106a and 106b are respectively moved in opposite directions of the arrows D and E, so that the Z-cylinder units 40e and 40g are moved away from the Y-travellers 26a and 26b and returned to a normal operating state shown in FIG. 12.

Figure 15:
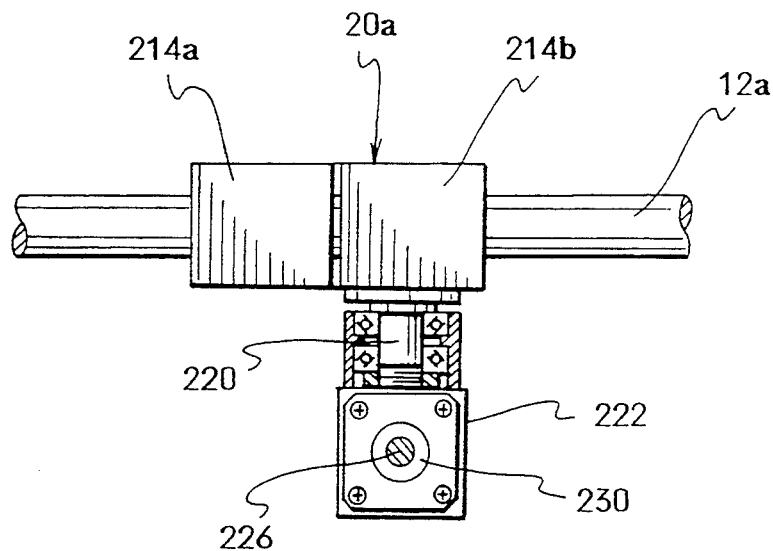
FIG. 15 is a partially omitted rear view of the X-traveller of the third embodiment.
Figure 16:
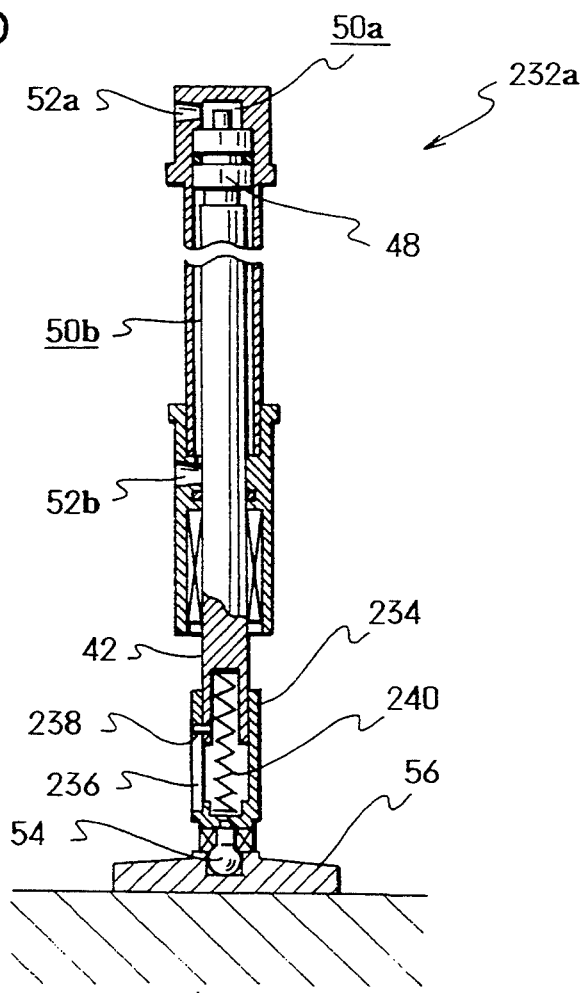
FIG. 16 is a sectional view of the Z-cylinder unit of the third embodiment.

The third embodiment will be explained with reference to FIGS. 14–16. Note that, elements, which have described in the foregoing embodiments, will be assigned the same symbols and explanation will be omitted.

Firstly, X-driving means will be explained. In FIG. 14, a pair of X-timing belts 200a and 200b are provided in the X-direction and respectively connected to the X-travellers 20a and 20b. The X-timing belt 200a is engaged with timing pulleys 202a and 202b, which are provided in the corner blocks 18b and 18c. On the other hand, the X-timing belt 200b is engaged with timing pulleys 202c and 202d, which are provided in the corner blocks 18a and 18d. The timing pulleys 202a and 202c are connected by a shaft (not shown), which is rotatably pierced through the hollow Y-guide 14a. The timing pulleys 202b and 202d are connected by a shaft 204, which is rotatably pierced through the hollow Y-guide 14b. The shaft 204 is directly rotated by a servo motor 206.

Therefore, when the motor 206 rotates the shaft 204, the X-timing belts 200a and 200b are run in the X-direction. By running the X-timing belt 200a and 200b, the X-travellers 20a and 20b are synchronously moved in the X-direction.

Next, Y-driving means will be explained. A pair of Y-timing belts 208a and 208b are provided in the Y-direction and respectively connected to the Y-travellers 26a and 26b. The Y-timing belt 208a is engaged with timing pulleys 202e and 202f, which are provided in the corner blocks 18a and 18b. On the other hand, the Y-timing belt 208b is engaged with timing pulleys 202g and 202h, which are provided in the corner blocks 18c and 18d. The timing pulleys 202f and 202g are connected by a shaft (not shown), which is rotatably pierced through the hollow X-guide 12a. The timing pulleys 202e and 202h are connected by a shaft 210, which is rotatably pierced through the hollow X-guide 12b. The shaft 210 is directly rotated by a servo motor 212.

Therefore, when the motor 212 rotates the shaft 210, the Y-timing belts 208a and 208b are run in the Y-direction. By running the Y-timing belt 208a and 208b, the Y-travellers 26a and 26b are synchronously moved in the Y-direction, Successively, structures of the X-travellers 20a and 20b and the Y-travellers 26a and 26b will be explained.

Note that, the X-travellers 20a and 20b and the Y-travellers 26a and 26b have substantially same structure, so the structure of the X-traveller 20a will be explained with further reference to FIG. 15.

In the X-traveller 20a, the first X-traveller constituting member comprises two sub-constituting members 214a and 214b. The sub-constituting members 214a and 214b slidably cover the X-guide 12a. The sub-constituting member 214a is connected to the X-timing belt 200a. On the other hand, the sub-constituting member 214b is not connected to the X-timing belt 200a. The sub-constituting members 214a and 214b are mutually connected by a cylinder unit 216, which is an example of the first rotating means. A cylinder section of the cylinder unit 216 is fixed to the sub-constituting member 214b; a front end of a rod 218 of the cylinder unit 216 is fixed to the sub-constituting member 214a. A shaft 220, which extends downwardly from a bottom face of the sub-constituting member 214b, is rotatably connected to a second X-traveller constituting member 222.

Figure 14:
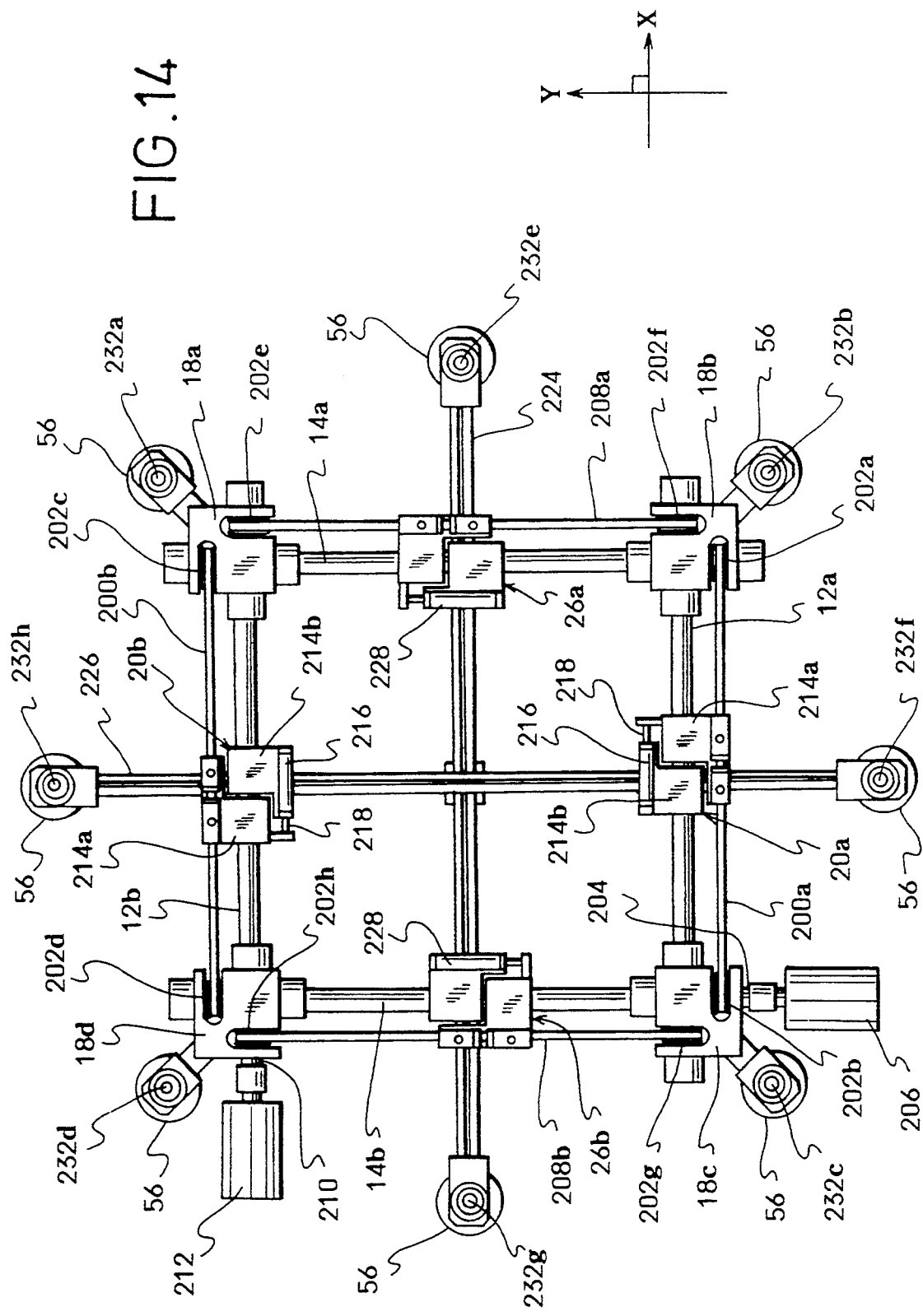
FIG. 14 is a plan view of the walking robot of a third embodiment of the present invention.

Note that, as shown in FIG. 14, the sub-constituting member 214a of the X-traveller 20a is provided on the right side; the sub-constituting member 214b thereof is provided on the left side. On the other hand, the sub-constituting member 214a of the X-traveller 20b is provided on the left side; the sub-constituting member 214b thereof is provided on the right side.

The Y-travellers 26a and 26b also have, as well as the X-travellers 20a and 20b, cylinder units 228, which are an example of second rotating means. When four cylinder units 216 and 228 are simultaneously driven, an X-rod 224 and a Y-rod 226, which are connected like a cross, are rotated with respect to the X- and the Y-directions. Therefore, by repeating to drive the cylinder units 216 and 228, the X-rod 224 and the Y-rod 226 can be rotated for a desired angle with respect to the X- and the Y-directions.

Note that, in the third embodiment, shafts with spline grooves are used for the X-rod 224 and the Y-rod 226, and the second Y-traveller constituting members (not shown) and the second X-traveller constituting members 222 have spline nuts 230, through which the X-rod 224 and the Y-rod 226 pass and with which the spline grooves of the X-rod 224 and the Y-rod 226 are capable of engaging. By engaging the X-rod 224 and the Y-rod 226 with the spline nuts 230, the X-rod 224 and the Y-rod 226 are certainly prevented from rotating about their axes.

Next, the Z-driving means of the third embodiment will be explained with reference to FIG. 16. Note that, Z-cylinder units 232a, 232b, 232c, 232d, 232e, 232f, 232g and 232h, which are an example of the Z-driving means, have the same structures, so the structure of the Z-cylinder unit 232a will be explained.

In most cases, the walking robot 10 walks on uneven surfaces. Thus, greater shock often works on the foot section 56, which is provided at the lower end of the cylinder rod 42. The walking robot 10 sometimes walks on surfaces with projections and holes, etc.. Then the Z-cylinder unit 232a has a connecting cylinder 234, which is provided between the cylinder rod 42 and the foot section 56, and the lower end section of the cylinder rod 42 is slidably fitted in the connecting cylinder 234. There is provided the universal joint 54, which is operatively attached to the foot section 56, at the lower end of the connecting cylinder 234. There is formed a long hole 236, which is formed in the vertical direction, on an outer circumferential face of the connecting cylinder 234, and a pin 238, which radially projects from the cylinder rod 42, is fitted, movably in the vertical direction in the long hole 236. With this structure, the cylinder rod 42 is not capable of rotating with respect to the connecting cylinder 234; the cylinder rod 42 is capable of moving in the vertical direction with respect to the connecting cylinder 234 within a stroke defined by the length of the long hole 236. There is provide an elastic member 240, e,g., a coil spring, in the connecting cylinder 234, The elastic member 240 is capable of absorbing shock, which works on the foot section 56. The shock absorbing mechanism is capable of, besides absorbing shock, stably making the foot section 56 contact rough surfaces, so that the walking robot 10 is capable of walking stably. Furthermore, the walking robot 10 is capable of always maintaining its body in a proper horizontal position.

Preferred embodiments of the present invention have been described in detail but the present invention is not limited to the embodiments, Many modifications, for example, using mechanisms including ball bearing screws or timing befits as the X-, Y- and Z-driving means instead of the air cylinder units, using hydraulic cylinder units instead of the air cylinder units, can be allowed without deviating from the scope and the spirit of the invention and the appended claims.

What is claimed is:

1. A walking robot, comprising:
   a pair of X-guides provided parallel in an X-direction;
   a pair of Y-guides provided parallel in a Y-direction perpendicular to the X-direction;
   four corner blocks for connecting each end of said X-guides and said Y-guides;
   a pair of X-travellers being capable of moving in the X-direction along said X-guides;
   a pair of Y-travellers being capable of moving in the Y-direction along said Y-guides;
   an X-rod provided in the X-direction, said X-rod being pierced through said Y-travellers;
   a Y-rod provided in the Y-direction, said Y-rod being pierced through said X-travellers, said Y-rod being connected to said X-rod;
   X-driving means for moving said X-travellers in the X-direction;
   Y-driving means for moving said Y-travellers in the Y-direction; and
   a plurality of Z-driving means for moving said corner blocks, said X-travellers and said Y-travellers in a Z-direction perpendicular to the X- and Y-directions, said Z-driving means being provided on said corner blocks, both ends of said X-rod and both ends of said Y-rod.

2. The walking robot according to claim 1, wherein said X-driving means are a pair of cylinder units having X-cylinders provided in the X-direction, and
   wherein said X-guides work as cylinder rods of said X-cylinders, so that said M-travellers are capable of moving with respect to said X-guides in the X-direction.

3. The walking robot according to claim 1, wherein said Y-driving means are a pair of cylinder units having Y-cylinders provided in the Y-direction, and
   wherein said Y-guides work as cylinder rods of said Y-cylinders, so that said Y-travellers are capable of moving with respect to said Y-guides in the Y-direction.

4. The walking robot according to claim 1, wherein said Z-driving means are cylinder units.

5. The walking robot according to claim 4, wherein cylinder rods of said cylinder units are capable of vertically moving, and each cylinder rod thereof has a foot section at a lower end.

6. The walking robot according to claim 5, wherein each foot section has a joint as an ankle.

7. The walking robot according to claim 1, wherein each X-traveller has a first X-traveller constituting member capable of moving along said X-guide; and a second X-traveller constituting member, to which said Y-rod is pierced through, arranged in the Z-direction with respect to said first X-traveller constituting member, said second X-traveller constituting member is capable of relatively rotating with respect to said first X-traveller constituting member, and
wherein each Y-traveller has a first Y-traveller constituting member capable of moving along said Y-guide; and a second Y-traveller constituting member, to which said X-rod is pierced through, arranged in the Z-direction with respect to said first Y-traveller constituting member, said second Y-traveller constituting member is capable of relatively rotating with respect to said first Y-traveller constituting member.

8. The walking robot according to claim 1, further comprising a mounting section being provided in the vicinity of a connected section of said X- and Y-rods.

9. The walking robot according to claim 1, further comprising mounting sections being provided on said corner blocks.

10. The walking robot according to claim 1, further comprising rollers for running being provided on said corner blocks.

11. The walking robot according to claim 1, wherein said X-driving means are a pair of timing belts, each of which is respectively connected to said X-travellers, and said X-travellers are moved in the X-direction with respect to said X-guides by running said timing belts.

12. The walking robot according to claim 1, wherein said Y-driving means are a pair of timing belts, each of which is respectively connected to said Y-travelers, and said Y-travellers are moved in the Y-direction with respect to said Y-guides by running said timing belts.

13. The walking robot according to claim 5, wherein each of said cylinder rods has a shock absorber, which can be extended and shortened in the Z-direction.

14. The walking robot according to claim 7, further comprising:
first rotating means for relatively rotating said first X-traveller constituting members with respect to said second X-traveller constituting members; and
second rotating means for relatively rotating said first Y-traveller constituting members with respect to said second Y-traveller constituting members.

15. The walking robot according to claim 14, wherein said first rotating means and said second rotating means are cylinder units.

* * * * *